(12) United States Patent
Morhan et al.

(10) Patent No.: US 12,729,668 B2
(45) Date of Patent: Sep. 8, 2026

(54) SMA STACK STRUCTURE FOR IMPROVED HEAT TRANSFER AND STRUCTURAL STABILITY

(71) Applicant: Exergyn Limited, Dublin (IE)

(72) Inventors: Matt Morhan, Dublin (IE); Greg Pittam, Dublin (IE)

(73) Assignee: Exergyn Limited, Dublin (IE)

( * ) Notice: Subject to any disclaimer, the term of this patent is extended or adjusted under 35 U.S.C. 154(b) by 0 days.

(21) Appl. No.: 18/874,215

(22) PCT Filed: Jun. 13, 2023

(86) PCT No.: PCT/EP2023/065863
§ 371 (c)(1),
(2) Date: Dec. 12, 2024

(87) PCT Pub. No.: WO2023/242227
PCT Pub. Date: Dec. 21, 2023

(65) Prior Publication Data

US 2025/0369427 A1 Dec. 4, 2025

(30) Foreign Application Priority Data

Jun. 13, 2022 (GB) ...................................... 2208655

(51) Int. Cl.
*F03G 7/06* (2006.01)

(52) U.S. Cl.
CPC ......... *F03G 7/0614* (2021.08); *F03G 7/0635* (2021.08)

(58) Field of Classification Search
CPC ....... F03G 7/0614; F03G 7/0635; F03G 7/064
See application file for complete search history.

(56) References Cited

U.S. PATENT DOCUMENTS 5,339,653 A * 8/1994 DeGregoria .......... F24F 3/1423 165/8
6,460,612 B1 * 10/2002 Sehmbey .............. F28D 15/046 174/15.2

(Continued)

FOREIGN PATENT DOCUMENTS

EP 1792079 B1 4/2010
GB 2615881 A * 8/2023 ......... F03G 7/06143

(Continued)

OTHER PUBLICATIONS

International Search Report issued in PCT/EP2023/065863 on Jun. 13, 2023 pp. 1-14; WO2021/219667; WO2019/149783.

*Primary Examiner* — Jesse S Bogue
(74) *Attorney, Agent, or Firm* — Nixon Peabody LLP

(57) ABSTRACT

The present application relates to a superelastic SMA structure, with enhanced power density and compressive stability, comprising two or more connected plate sections to form an overall substantially closed perimeter, wherein the structure comprises an opening positioned in the centre of the structure, and wherein the connected plate sections are dimensioned with a circular symmetry to allow a stacking assembly, and wherein each section includes an array of hollow perforated cells formed between one or more thin vertical walls of a thickness within a predefined range of values, and wherein at least one perforated cell defines a fluid passageway within a predefined range of hydraulic diameter values.

16 Claims, 8 Drawing Sheets

(56) References Cited

U.S. PATENT DOCUMENTS

| | | | | |
|---|---|---|---|---|
| 6,949,094 | B2 * | 9/2005 | Yaron | A61B 18/02 606/21 |
| 7,655,001 | B2 * | 2/2010 | Petrakis | G01K 5/483 60/527 |
| 8,747,264 | B2 * | 6/2014 | Alexander | F02G 5/04 60/527 |
| 9,316,152 | B2 * | 4/2016 | Subbareddyar | F02C 7/18 |
| 10,018,385 | B2 * | 7/2018 | Radermacher | C09K 5/10 |
| 10,428,805 | B2 * | 10/2019 | Gissen | B21C 23/002 |
| 11,486,648 | B2 * | 11/2022 | Muneishi | F28F 9/0202 |
| 12,383,066 | B2 * | 8/2025 | Pinkelman | A47C 7/144 |
| 2013/0139538 | A1 * | 6/2013 | Aso | F25B 30/04 62/324.1 |
| 2019/0032969 | A1 | 1/2019 | Bartholome | |

FOREIGN PATENT DOCUMENTS

| | | | |
|---|---|---|---|
| WO | 2019149783 | A1 | 8/2019 |
| WO | 2021219667 | A1 | 11/2021 |

* cited by examiner

| Wall Thickness | Power Density |
|---|---|
| mm | kW.kg$^{-1}$ |
| 0.063 | 19.7 |
| 0.074 | 16.55 |
| 0.088 | 13.90 |
| 0.105 | 11.66 |
| 0.125 | 9.79 |
| 0.149 | 8.21 |
| 0.177 | 6.88 |
| 0.210 | 5.77 |
| 0.250 | 4.83 |
| 0.297 | 4.04 |
| 0.354 | 3.38 |
| 0.420 | 2.82 |
| 0.500 | 2.35 |
| 0.595 | 1.96 |
| 0.707 | 1.63 |
| 0.841 | 1.35 |
| 1.000 | 1.12 |
| 1.189 | 0.92 |
| 1.414 | 0.76 |
| 1.682 | 0.62 |
| 2.000 | 0.51 |

902

904

SMA STACK STRUCTURE FOR IMPROVED HEAT TRANSFER AND STRUCTURAL STABILITY

CROSS-REFERENCE TO RELATED APPLICATIONS

This application is a national stage application of International Application No. PCT/EP2023/065863, filed on Jun. 13, 2023, which claims priority to UK Application No. GB2208655.7, filed on Jun. 13, 2022, each of which is hereby incorporated by reference herein in its entirety.

FIELD

The present disclosure relates to a Shape Memory Alloy (SMA) stack or plate structure. In particular the disclosure relates to a superelastic SMA structure with enhanced power density and improved compressive stability.

BACKGROUND

Recent research into the Elastocaloric [EC] effect has demonstrated its potential as a solid-state alternative to traditional Vapour Compression refrigeration and heat pumping approaches. The EC cycle takes advantage of the superelastic behaviour of Shape Memory Alloys, which facilitates, through cyclic uniaxial loading and unloading, the absorption of heat from a low temperature source and its rejection to a higher temperature sink.

There has been a lot of interest recently in the use of SMA material to make energy recovery devices and heat pump/refrigeration systems. One example of a use of SMA plate material is in a heat pump device comprising at least one stack of a plurality of plates where at least two plates are formed of a SMA material and assembled, the plurality of SMA plates having one or a plurality of fluid ports adapted to allow passage of a working fluid through the stack. Such an application of a SMA stack application is disclosed in PCT patent publication number WO2021/219667, assigned to Exergyn Ltd.

WO2021/219667 describes a known SMA plate structure (as shown in FIG. 1) substantially rectangular in shape with a number of rectangular openings to allow for a working fluid to flow through one or more openings. Heat transfer from the SMA into and out of the working fluid is critical for stack thermal performance. Thinner walls give faster heat transfer, but this also reduces the stack stability when under a compressive load.

US 2016/0084544 discloses a system for heating/cooling and includes a plurality of thermoelastic modules. Each of the modules includes one or more structures formed of shape memory alloy, which converts from austenite to martensite upon application of a first stress and releases latent heat from the conversion. The system includes tubes of SMA. However, the tubes lack durability, making the tubes uncommercial in terms of buckling strength and manufacturing cost for macro scale heating and cooling devices. The tubes are thermally inefficient and do not expand and/or contract uniformly. Moreover, the tubes suffer from buckling during use.

There is therefore a need for an improved and more stable SMA stack structure that has an improved rate of heat transfer into and out of the SMA material (and therefore power density) while maintaining structural strength.

SUMMARY

The present invention relates to a structure formed by an SMA material, as set out in the appended claims. The SMA structure is particularly suited for use in a heat pump/refrigeration system.

In one embodiment there is provided a superelastic SMA structure with improved power density and compressive stability, the structure comprising a substantially hexagonal or circular structure shape to define an array of hollow perforated cells formed between one or more thin vertical walls wherein each perforated cell defines a liquid or gas passageway. Any reference within this text referring to fluid is determined to mean a working heat transfer fluid, which can be in the form of a gaseous substance or a liquid fluid.

In one embodiment there is provided a superelastic SMA structure with enhanced power density and compressive stability, the structure comprising a substantially hexagonal or circular structure shape to define an array of hollow perforated cells formed between one or more thin vertical walls of a thickness within a defined range of values, and wherein at least one perforated cell defines a fluid passageway within a certain range of hydraulic diameter values.

In one aspect of the present invention, there is provided a superelastic SMA structure, comprising two or more connected plate sections to form an overall substantially closed perimeter, wherein the structure comprises an opening positioned in the centre of the structure, and wherein the connected plate sections are dimensioned with a circular symmetry to allow a stacking assembly, and wherein each section includes an array of hollow perforated cells formed between one or more thin vertical walls of a thickness within a predefined range of values, and wherein at least one perforated cell defines a fluid passageway within a predefined range of hydraulic diameter values.

In an embodiment of the present invention, each hollow perforated cell has a substantially hexagonal honeycomb shape or a circular shape. Further, the opening positioned in the centre of the structure provides a larger second moment of area, therefore allowing stability from buckling, and longer stacks with reduced support structures. There is a numerical relationship between stack diameter, second moment of area, stack height or length, and power density. Also, the structure with an opening in the center has improved heat flux (W/m2) or heat transfer coefficient (W/m2/K).

In one embodiment the thickness of the one or more vertical walls is selected from the range between 0.75 mm and 1.25 mm.

In one embodiment the thickness of the vertical walls is 1 mm. It has been shown that when the SMA material mid-point to fluid wall distance is reduced to around 0.5 mm, exponential improvements can be made in heat transfer, and therefore power density is also improved.

In one embodiment an effective hydraulic diameter of the fluid passageway for one or more cells is selected from the range between 2 mm and 3 mm.

In one embodiment the effective hydraulic diameter of the fluid passageway is 2.4 mm.

In one embodiment the structure comprises a large opening positioned near the centre of the structure.

In one embodiment the opening is dimensioned to accommodate a support element.

In one embodiment the support element comprises a central pillar and dimensioned to support a plurality of superelastic SMA structures.

In one embodiment the structure comprises two or more connected plate sections to form an overall substantially closed perimeter, with each section a substantially hexagonal or circular structure shape to define an array of hollow perforated cells formed between one or more thin vertical walls wherein each perforated cell defines a fluid passageway.

In one embodiment the number of connected sections comprises three or six sections.

In one embodiment the connected sections are dimensioned with a circular symmetry to allow a stacking assembly.

In one embodiment the connected sections are dimensioned with such a pattern to allow full or partial nesting during manufacture from larger sheets.

In one embodiment each section is configured to interlock with an adjacent section to define the superelastic SMA structure.

In one embodiment a tensioning element is positioned around the outer perimeter of the structure.

In one embodiment a tensioning element is positioned around the inner perimeter of the structure opening.

In one embodiment a tensioning element is positioned around the exterior perimeter of the structure opening, and/or an array of individual tension elements so arranged around the exterior of the stack positioned to reduce SMA loading during operation.

In one embodiment one or more tensioning elements are positioned internally and externally to reduce SMA loading during operation.

In one embodiment the tensioning element is thermally insulated from, or insulated with respect to, the SMA structure.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
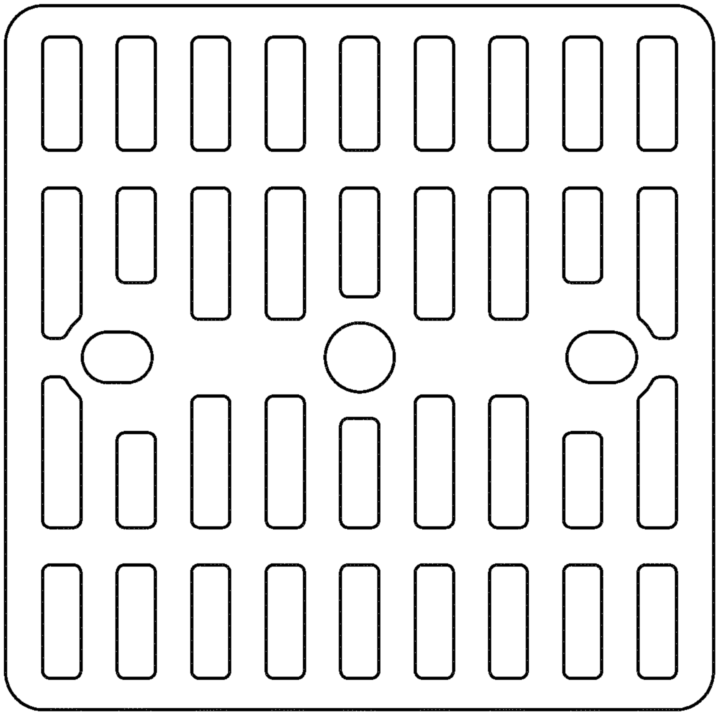
FIG. 1 is a prior art SMA plate material that can be used in an elastocaloric device or system.
Figure 2:
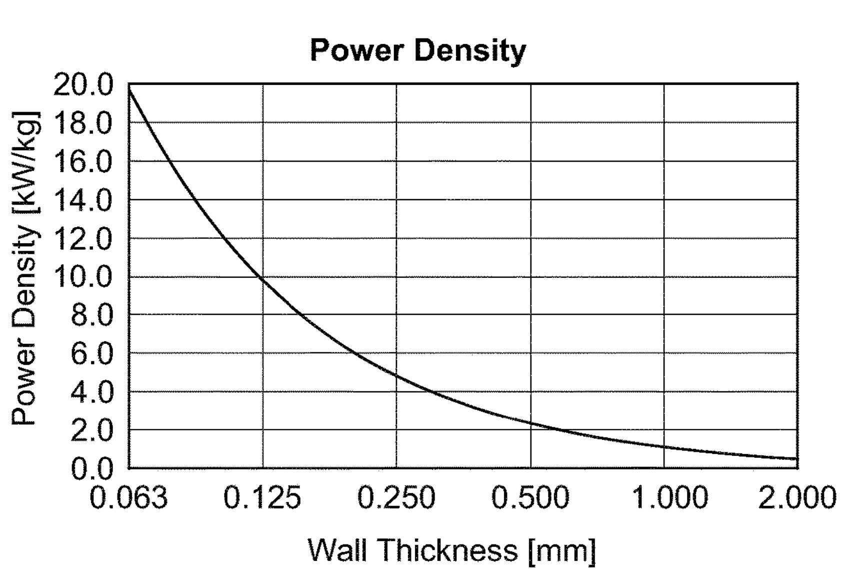
FIG. 2 illustrates a graph and a table showing the relationship between power density and material mid-point to fluid channel distance of the SMA material.

A SMA plate stack application is disclosed in PCT patent publication number WO2021/219667, assigned to Exergyn Ltd. It is desirable that each plate has a superelastic SMA structure with enhanced power density and compressive strength. In practice this means a compromise has to be reached in improving plate design. FIG. 2 is an illustration of the SMA mid-point to fluid distance vs power density. The invention can be used to make a core which may comprise of a single stack or multiple stacks of SMA material which are mechanically aligned axially in series and loaded. The SMA structure as herein described is suitable to be used in a thermodynamic cycle for heating and cooling in a system having SMA material.

Figure 3:
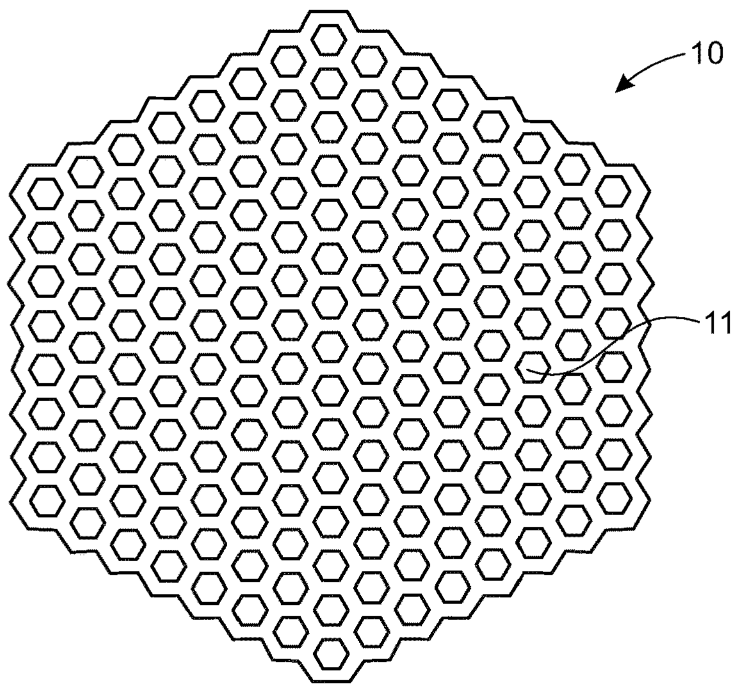
FIG. 3 illustrates a plan view of a hexagonal shaped superelastic SMA structure according to one aspect of the present invention.

According to a preferred embodiment of the invention a superelastic SMA structure with enhanced power density and compressive stability is provided. FIG. 3 illustrates an SMA structure comprising a substantially hexagonal honeycomb structure shape 10 to define an array of hollow perforated cells 11 formed between one or more thin vertical walls and open at both ends. Each perforated cell 11 defines a fluid passageway to allow fluid flow through to activate the SMA structure 10. The purpose of the hexagonal honeycomb structure is to achieve a mid-point to fluid channel distance of substantially less than 1 mm. The overall thickness of the vertical wall is therefore ideally near 1 mm. It has been shown that when the SMA mid-point to fluid wall distance is around 0.5 mm or less, substantial improvements can be made in heat transfer, and therefore power density is also improved, as illustrated in the table of FIG. 2.

Figure 4:
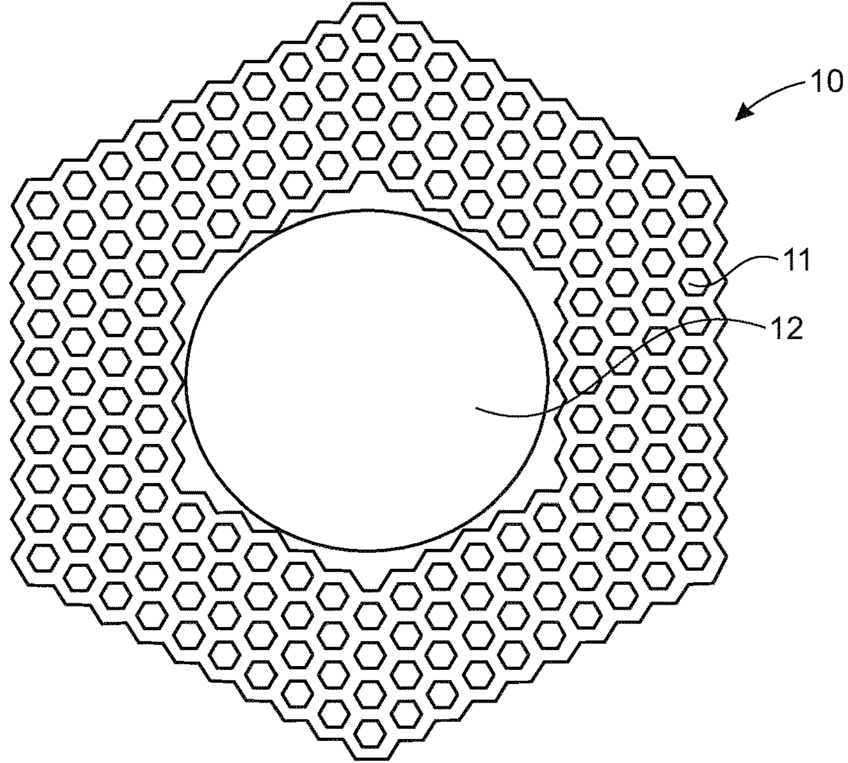
FIG. 4 illustrates a plan view of a hexagonal shaped SMA structure with an opening cut through its centre.

FIG. 4 illustrates a plan view of a hexagonal shaped superelastic SMA structure with an opening 12 cut through its centre. This embodiment involves a larger footprint but open central area 12, meaning the manifolding for fluid transfer can be easier to implement. This embodiment gives a larger second moment of area, therefore allowing greater stability from buckling and so longer stacks with less support structure. The superelastic SMA structure 10 comprises two or more connected plate sections to form an overall substantially closed perimeter, wherein the structure comprises an opening 12 positioned in the centre of the structure, and wherein the connected plate sections are dimensioned with a circular symmetry to allow a stacking assembly, and wherein each section includes an array of hollow perforated cells formed between one or more thin vertical walls of a thickness within a predefined range of values, and wherein at least one perforated cell defines a fluid passageway within a predefined range of hydraulic diameter values.

Figure 5:
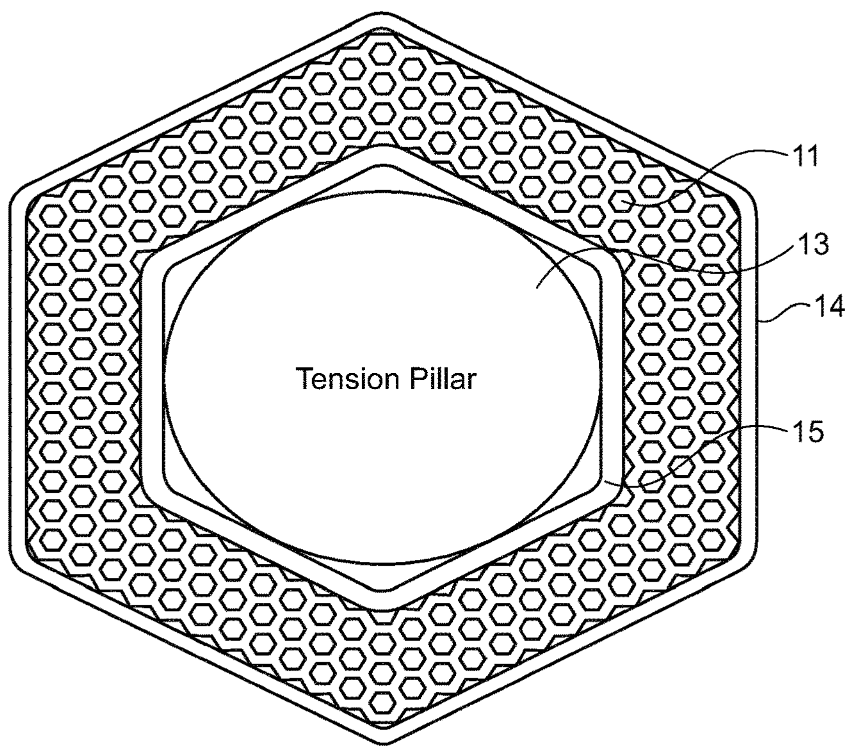
FIG. 5 illustrates a plan view of a hexagonal shaped SMA structure with an opening cut through its centre and a tension pillar located within the inner perimeter of the structure.

FIG. 5 illustrates a plan view of a hexagonal shaped superelastic SMA structure with an opening cut through its centre and a thermally isolated tension pillar 13 located in the centre. In this embodiment the manifolding at each end of the SMA stack structure 10 can be from both the outer and/or inner faces of the hexagonal shaped superelastic SMA structure making the flow management of fluid easier. The thick perimeter lines as shown in FIGS. 5 and 6 represent a rigid, flexible, or combination of both, structure to ensure thermal isolation, 14, 15 of the tension pillar 13 from the SMA stack, and also to ensure any working fluid within the SMA stack is entrained only within that active SMA stack area.

Figure 6:
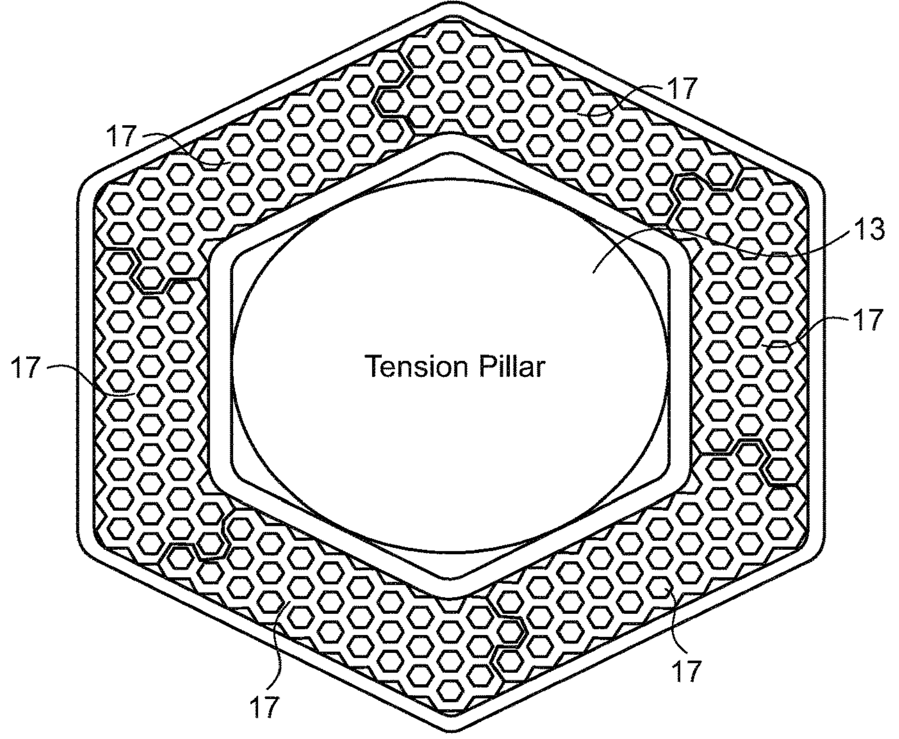
FIG. 6 illustrates a plan view of a hexagonal shaped SMA structure divided into interlocking parts.

FIG. 6 illustrates a plan view of a hexagonal shaped superelastic SMA structure where the structure is made from a number of elements or sections 17. In this embodiment the superelastic SMA structure can be split into three or six identical parts 17 that are designed with circular symmetry. If these identical parts 17 are designed so that they "jigsaw" or interlock together, they create a core assembly that is self-interlocking, self-supporting and provide a more robust solution. The interlocking of the SMA elements allows nesting of components when cutting from sheet SMA material and therefore is efficient for production cost purposes, and reducing waste.

Figure 7:
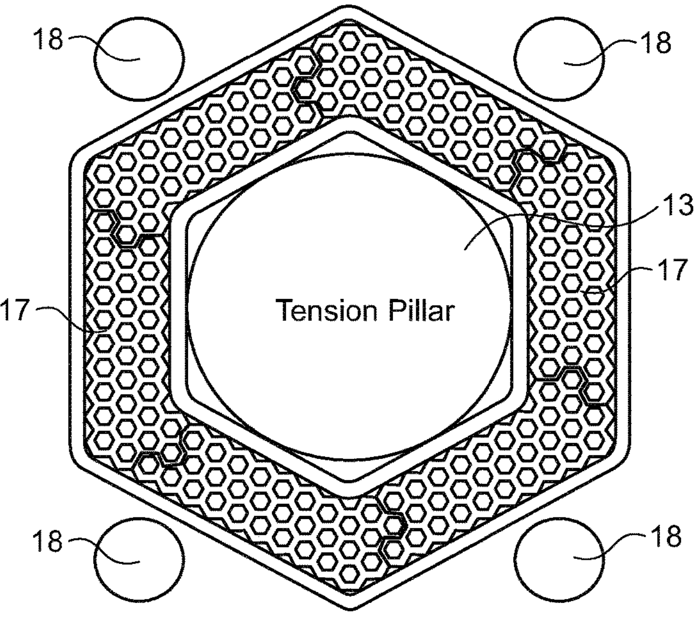
FIG. 7 illustrates a plan view of a hexagonal shaped SMA structure divided into interlocking parts with multiple tension carrying elements.

FIG. 7 illustrates a plan view of a hexagonal shaped superelastic SMA structure where the structure is made from a number of elements or sections 17. A plurality of tension elements 18 can be arranged around the internal, external, or both perimeters of the SMA stack in order to reduce the loading forces applied. One internal element 13 and four external elements 18 are shown for illustration.

Figure 8:
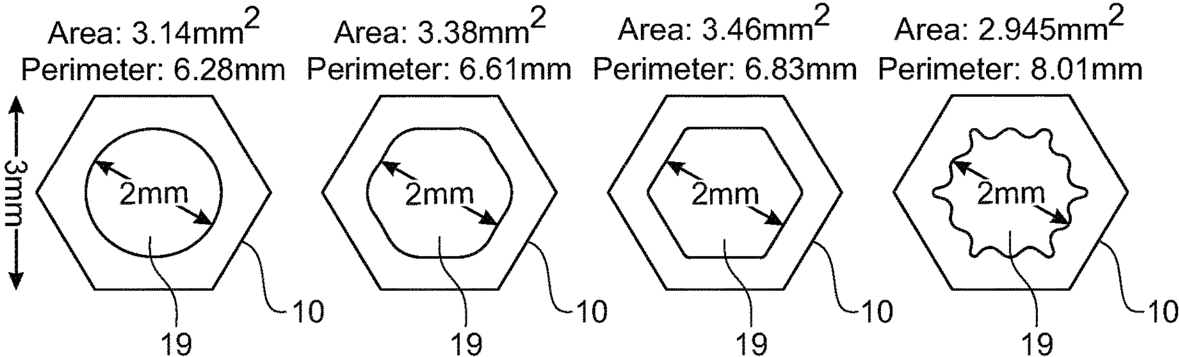
FIG. 8 illustrates a number of views of the hexagonal shaped superelastic SMA structure with different shaped openings.

FIG. 8 illustrates a number of views of the hexagonal shaped superelastic SMA structures 10 with different shaped openings 19. The overall shape of the openings 19 can have a bearing on performance. While a hexagonal opening is shown in the previous figures there are structural stability benefits in an annulus geometry with a slight expense of surface area: mass ratio.

The SMA wall thickness in the honeycomb-type structures above has been selected at 1 mm overall as this provides an optimum balance between rate of heat transfer from the SMA and compressive stability, where the structure is stable enough to allow sufficient stack height to be practically useful, so that a plurality of the SMA structures can be stacked together. An ideal/optimised range of 0.75 mm-1.25 mm can be selected to implement superelastic SMA structure with enhanced power density and compressive stability. It will be appreciated that by going smaller than this range value and keeping stack stability means that small fluid channels must be used, and these create significant pressure drop in the system and so reduce efficiency due to pumping losses during operation.

The hydraulic diameter affects heat transfer rate and pressure drop during operation. The hydraulic diameter varies with internal passage geometry. The example given in FIG. 8 shows a nominal 2 mm dimension across the passage but each presents a quite different hydraulic diameter. Suitably a range of 2 mm to 3 mm is the optimum range for fluid channel hydraulic diameter when taking into account pressure drop through the passageway. This gives the best balance of heat transfer from SMA to fluid, stack stability, and reduced pumping losses.

Figures 9A, 9B:
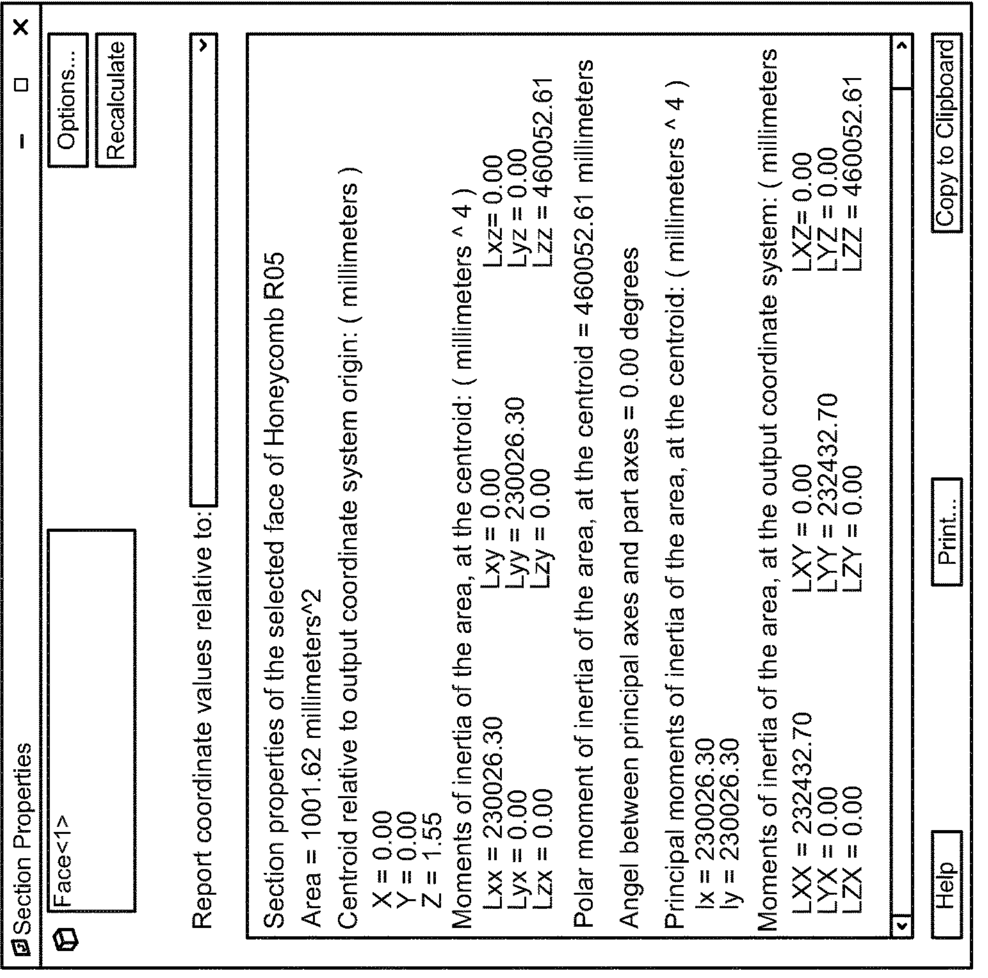
FIGS. 9 (*a*) and (*b*) illustrate a hexagonal shaped SMA structure with circular shaped holes, in accordance with an embodiment of the present invention.

FIGS. 9(*a*) and (*b*) illustrate a hexagonal shaped SMA structure 902 with circular shaped holes 904, in accordance with an embodiment of the present invention. In said hexagonal shaped SMA structure 902, the fluid channel ID ranges from 2.4 mm to 2.5 mm, hydraulic diameter (Dh) ranges from 2.4 mm to 2.5 mm, and SMA wall thickness ranges from 0.9 mm to 1 mm. The ratio of fluid to SMA area ranges from 0.705 to 0.821, and wetted perimeter ranges from 1176.2 mm to 1225.22 mm.

Figure 10:
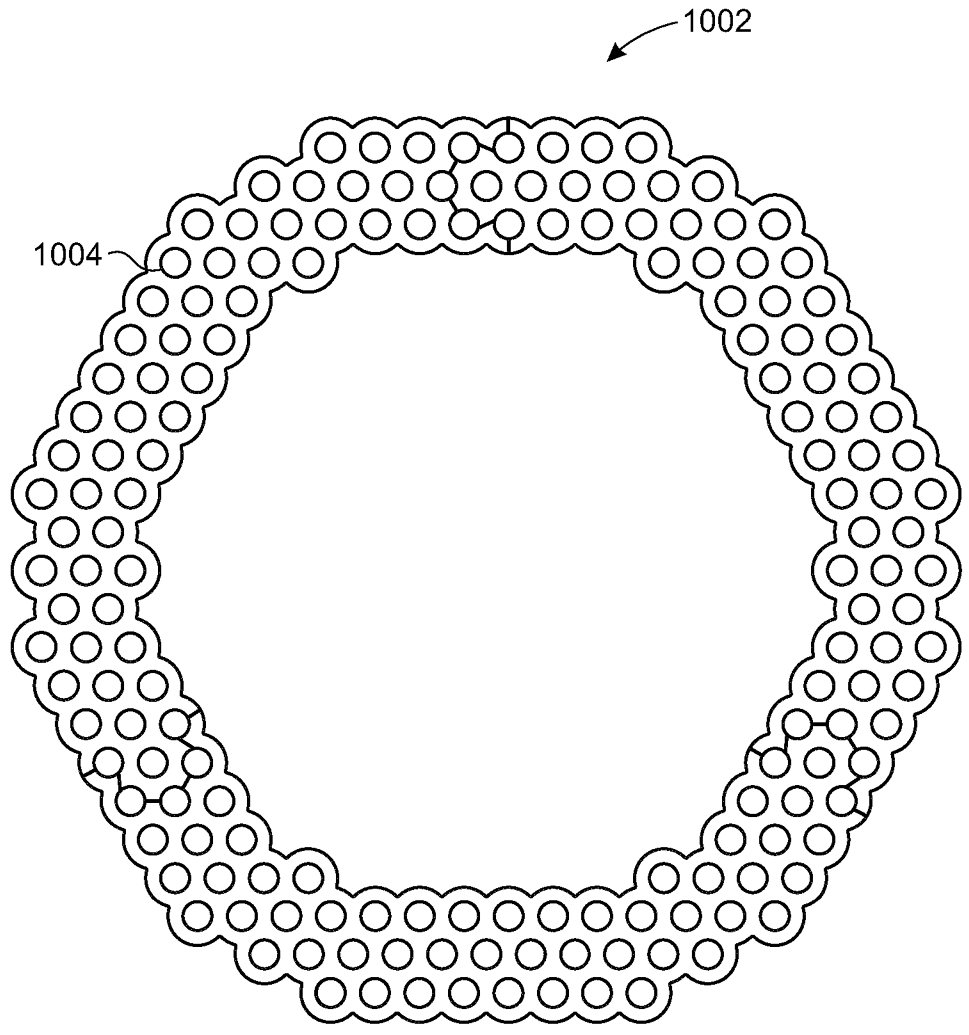
FIG. 10 illustrate a substantially hexagonal shaped SMA structure with circular shaped holes, in accordance with an embodiment of the present invention.

FIG. 10 illustrates a substantially hexagonal shaped SMA structure 1002 with circular shaped holes 1004, in accordance with an embodiment of the present invention. In the hexagonal shaped SMA structure 1002, the fluid channel ID ranges from 2 to 2.4 mm, hydraulic diameter (Dh) ranges from 2 to 2.4 mm, SMA wall thickness is 1 mm, the ratio of fluid to SMA area ranges from 0.545 to 0.667, and the wetted perimeter ranges from 1005.31 to 1147.7 mm. The SMA structure 1002 is made up of a number of interlocking SMA elements in a similar manner to the SMA structure described in FIG. 6. It will be appreciated other suitable dimensions can be used.

Figures 11A, 11B:
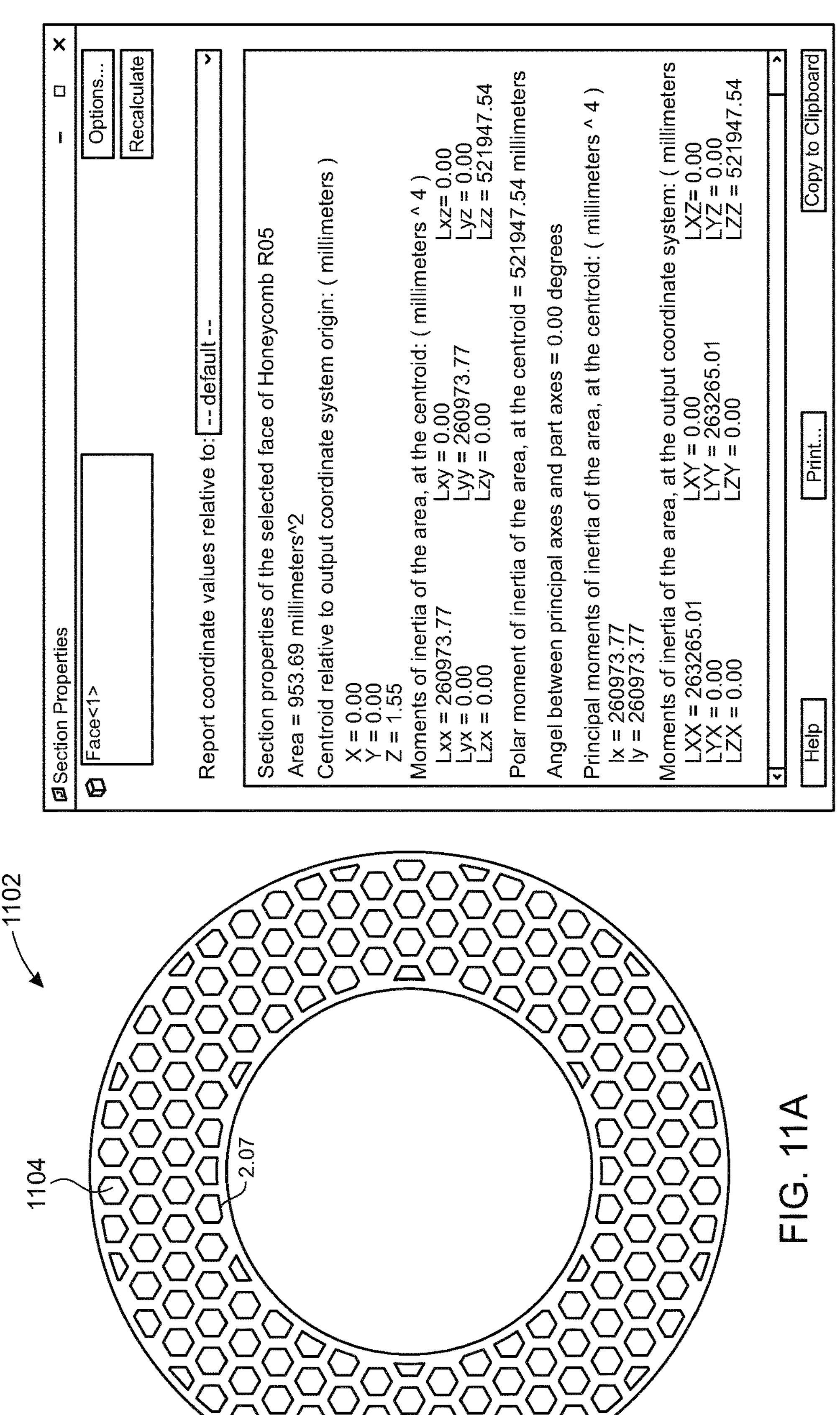
FIGS. 11 (*a*) and (*b*) illustrate a circular shaped SMA structure with hexagonal shaped holes, in accordance with an embodiment of the present invention.

FIGS. 11 (*a*) and (*b*) illustrate a circular shaped SMA structure 1102 with hexagonal shaped holes 1104, in accordance with an embodiment of the present invention. In said SMA structure 1102, the fluid channel ID ranges from 2 to 2.4 mm, hydraulic diameter (Dh) ranges from 2 mm to 2.425 mm, SMA wall thickness is 1 mm, the ratio of fluid to SMA area ranges from 0.698 to 0.797, and the wetted perimeter ranges from 1271.1 mm to 1327.4 mm. It will be appreciated other suitable dimensions can be used.

It will be appreciated that in the context of the present invention the following definitions apply throughout this specification:

Segment—a section of a plate that is so arranged to allow efficient cutting, nesting or stacking of two or more segments to then bring together and form a plate of planar form.

Plate—individual SMA element with one or more fluid passageways created to allow fluid flow through the plates to facilitate heat transfer.

Stack-plurality of SMA plates, comprising a minimum of two plates which are assembled together.

Housing—containment for a stack of plates. Provides thermal isolation and fluid inlet/outlet.

Core—can consist of a single stack or multiple stacks which are mechanically aligned axially in series and loaded.

Fluid—The heat transfer medium used to accept or reject heat into and out of the SMA plates during operation. This fluid can be a gas, liquid, or in a transitionary phase change state between solid-liquid or liquid-gas.

Wall thickness—the total distance from one fluid channel to an adjacent fluid channel, normal to the wall. This is in effect twice the material mid-point to fluid distance.

Hydraulic diameter—Used for non-circular fluid channels and can be defined as four times the cross sectional area divided by the wetted perimeter of the channel.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A superelastic SMA structure, comprising:

an opening positioned in the centre of the structure;

two or more connectable plate sections forming a connected plate section with a substantially closed perimeter, the two or more connectable plate sections being dimensioned with a circular symmetry to allow a stacking assembly of a plurality of connected plate sections that includes the connected plate section, the circular symmetry being relative to the opening;

wherein each of the two or more connectable plate sections includes an array of hollow perforated cells formed across a surface of the two or more connectable plate sections, the array of hollow perforated cells being separated by one or more vertical walls of a thickness within a predefined range of values, the thickness of the one or more vertical walls being a dimension between adjacent cells of the array of hollow perforated cells; and wherein at least one perforated cell of the array of hollow perforated cells defines a fluid passageway within a predefined range of hydraulic diameter values.

2. The superelastic SMA structure of claim 1, wherein the thickness of the one or more vertical walls is selected from the range of between 0.75 millimeters (mm) and 1.25 mm.

3. The superelastic SMA structure of claim 1, wherein the thickness of the one or more vertical walls is 1 millimeter (mm).

4. The superelastic SMA structure of claim 1, wherein a hydraulic diameter of the fluid passageway for one or more cells is selected from the range of between 2 millimeter (mm) and 3 mm.

5. The superelastic SMA structure of claim 1, wherein the opening is dimensioned to accommodate a support element.

6. The superelastic SMA structure of claim 5, wherein the support element comprises a central pillar and dimensioned to support a plurality of superelastic SMA structures.

7. The superelastic SMA structure of claim 1, wherein each of the two or more connectable plate sections has a substantially hexagonal structure shape or a circular shape.

8. The superelastic SMA structure of claim 1, wherein each cell of the array of hollow perforated cells has a substantially hexagonal honeycomb shape or a circular shape.

9. The superelastic SMA structure of claim 1, wherein the two or more connectable plate sections comprises three or six sections.

10. The superelastic SMA structure of claim 1, wherein the two or more connectable plate sections are dimensioned with such a pattern to allow full or partial nesting during manufacture from larger sheets.

11. The superelastic SMA structure of claim 1, wherein each of the two or more connectable plate sections is configured to interlock with an adjacent section to define the superelastic SMA structure.

12. The superelastic SMA structure of claim 1, wherein a tensioning element is positioned around an outer perimeter of the structure.

13. The superelastic SMA structure of claim 1, wherein a tensioning element is positioned around an inner perimeter of the structure opening.

14. The superelastic SMA structure of claim 1, wherein a tensioning element is positioned around an exterior perimeter of the opening, and/or an array of individual tension elements so arranged around an exterior of the stacking assembly and positioned to reduce SMA loading during operation.

15. The superelastic SMA structure of claim 1, wherein one or more tensioning elements are positioned internally and externally to reduce SMA loading during operation.

16. The superelastic SMA structure of claim 1, further comprising a tensioning element that is thermally insulated from, or insulated with respect to, the SMA structure to reduce SMA loading during operation.

* * * * *